Aug. 5, 1969    H. PROGLER ET AL    3,459,148
TANKSHIP FOR LIQUEFIED GASES
Filed Aug. 29, 1967    14 Sheets-Sheet 2
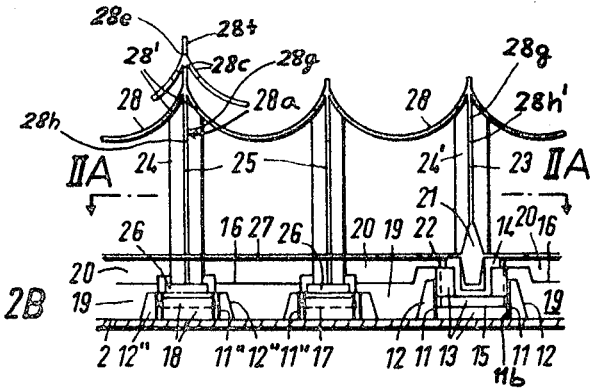
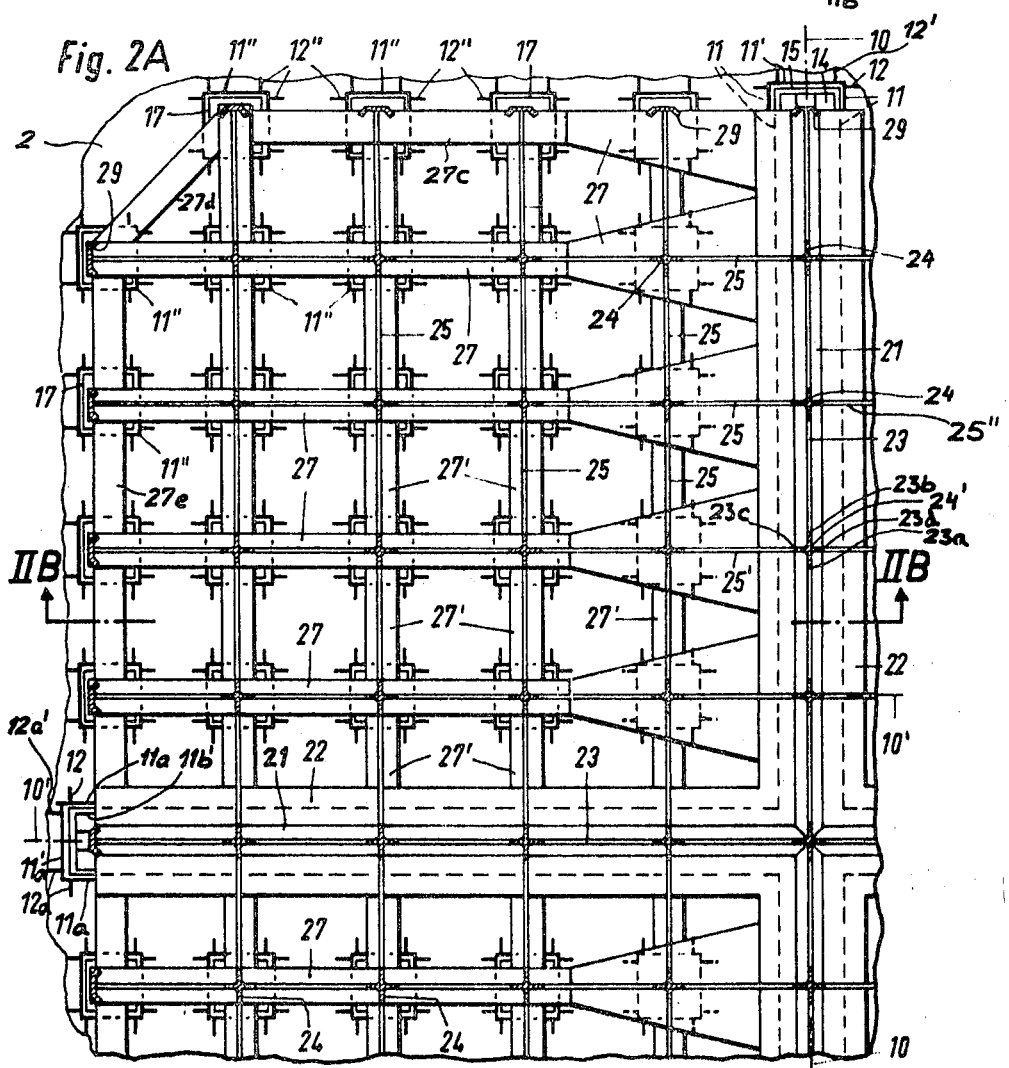
INVENTORS
Hans Progler
Wilhelm Samaga
Hermann Ehms
Rudolf Eickemeyer

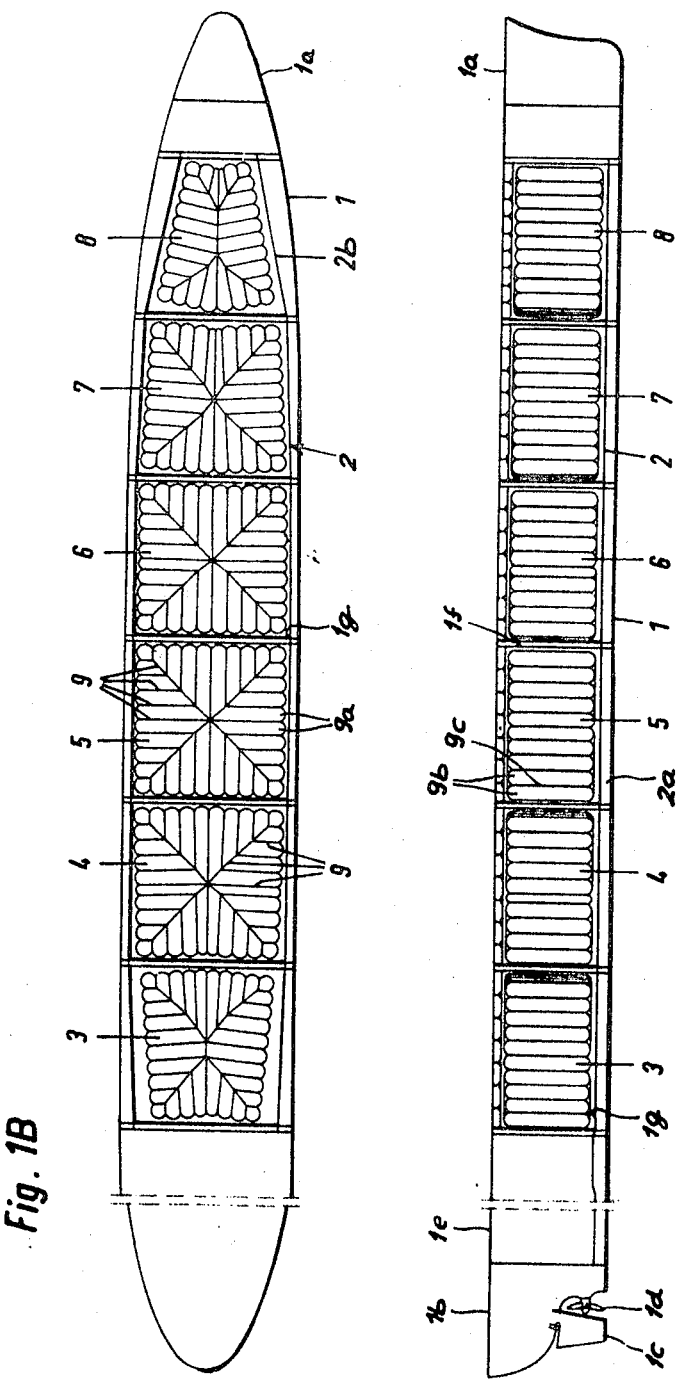

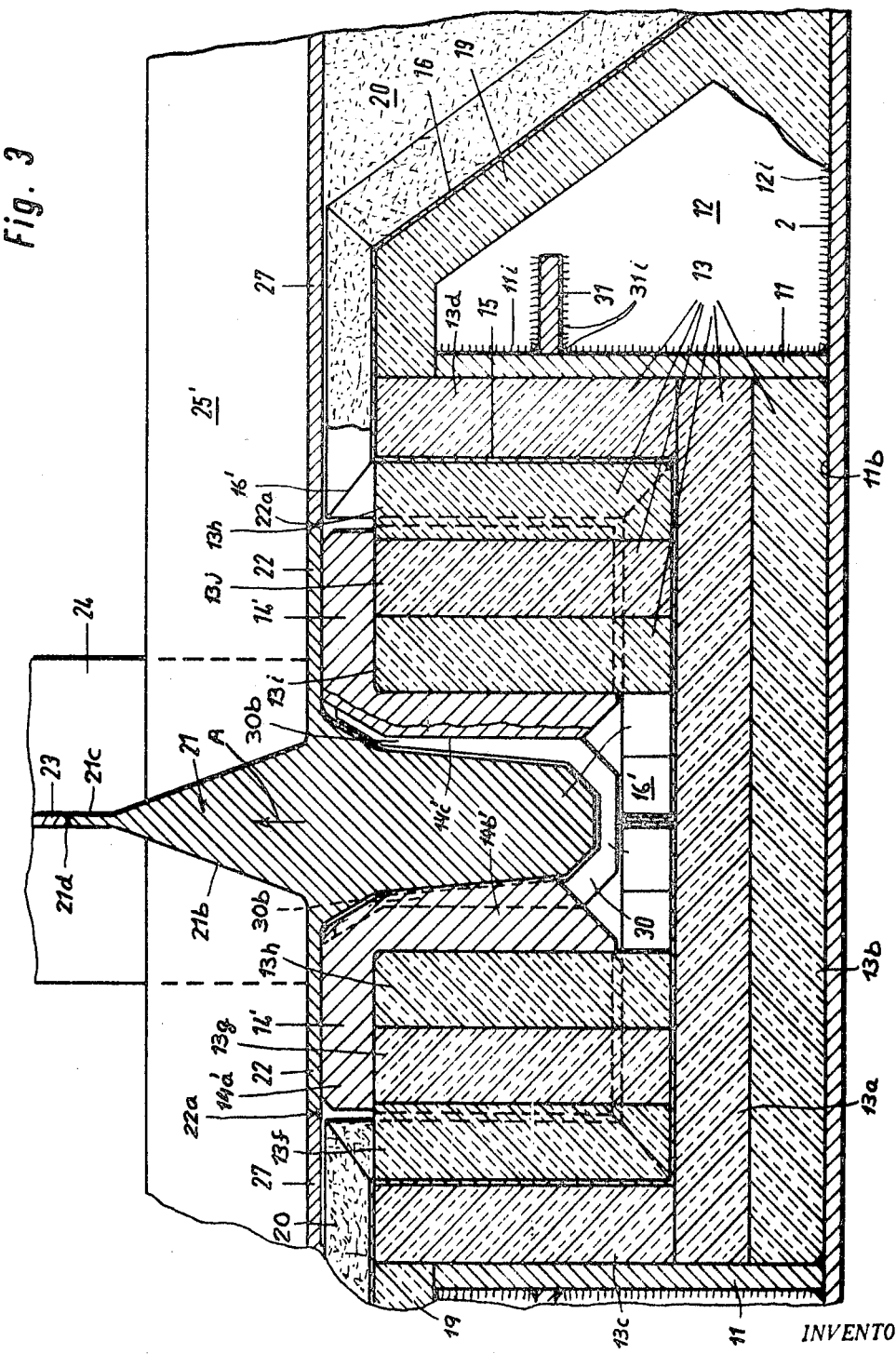

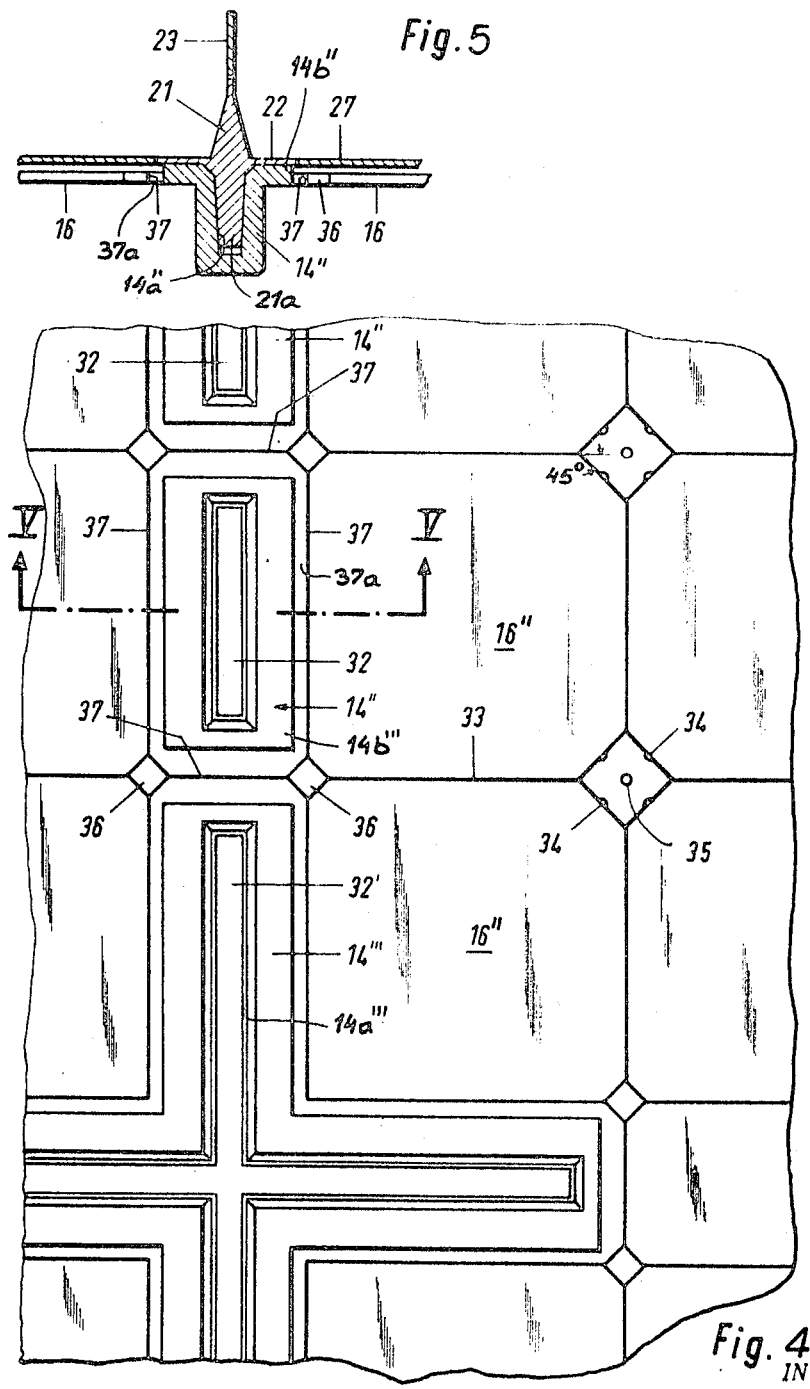

Aug. 5, 1969    H. PROGLER ET AL    3,459,148
TANKSHIP FOR LIQUEFIED GASES
Filed Aug. 29, 1967    14 Sheets-Sheet 5
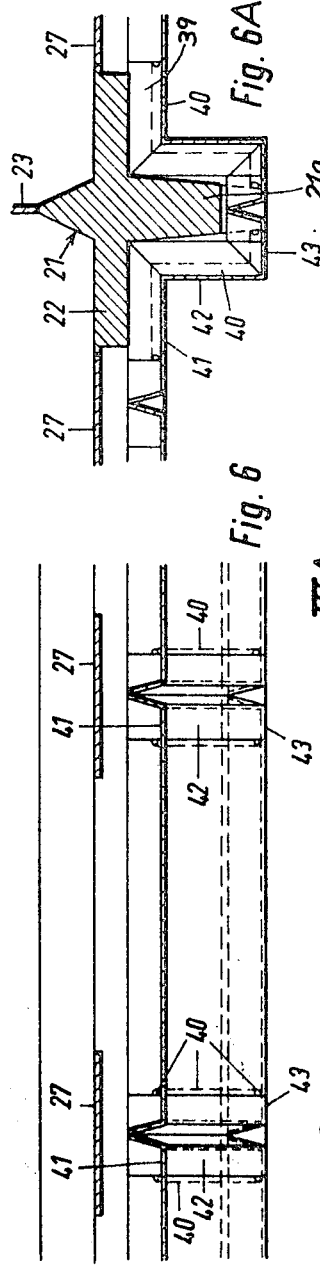
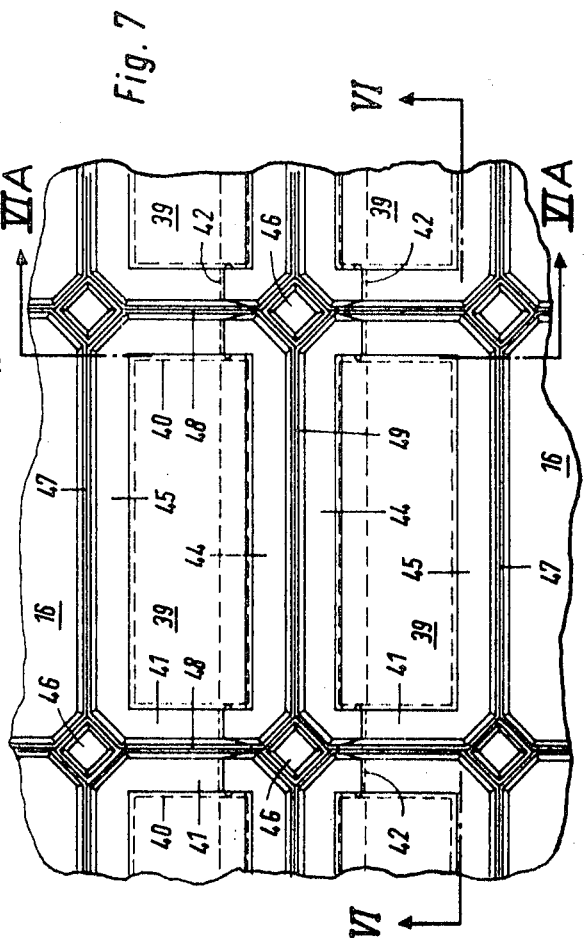
INVENTORS
Hans Progler
Wilhelm Samaga
Hermann Ehms
Rudolf Eickemeyer

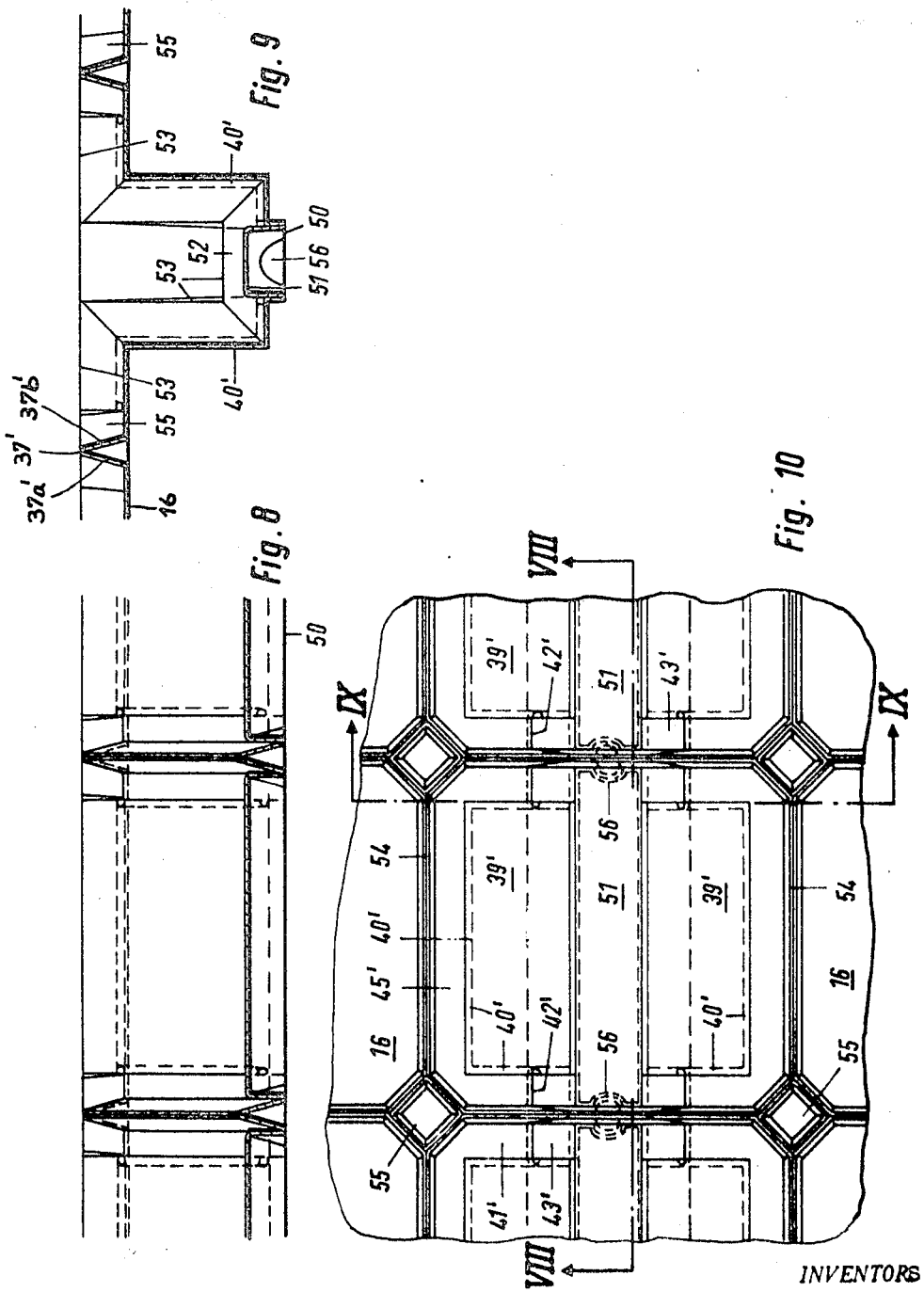

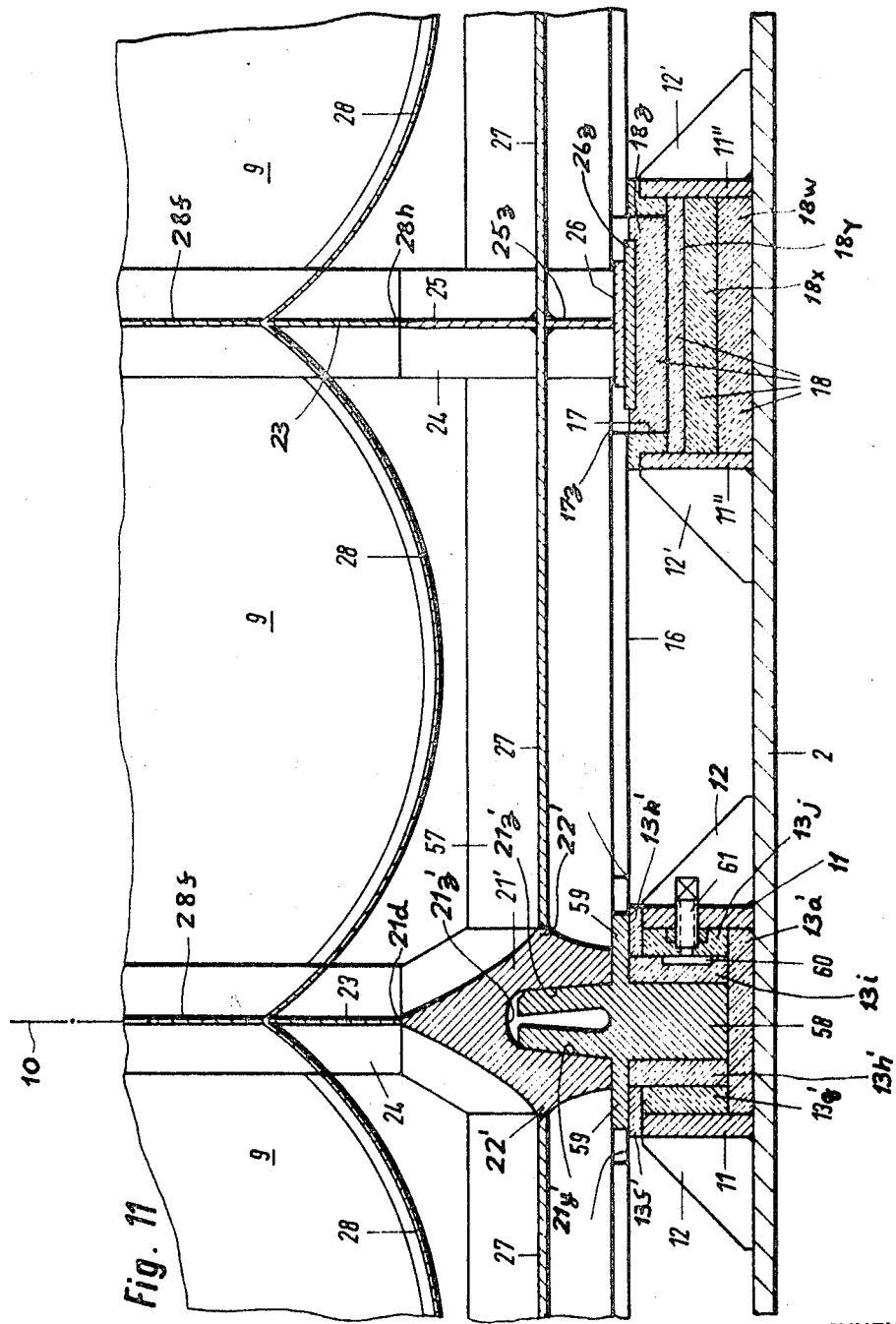

INVENTORS
Hans Progler
Wilhelm Samaga
Hermann Ehms
Rudolf Eickemeyer

Aug. 5, 1969 H. PROGLER ET AL 3,459,148
TANKSHIP FOR LIQUEFIED GASES
Filed Aug. 29, 1967 14 Sheets-Sheet 11

INVENTORS
Hans Progler
Wilhelm Samaga
Hermann Ehms
Rudolf Eickemeyer

INVENTORS
Hans Progler
Wilhelm Samaga
Hermann Ehms
Rudolf Eickemeyer

INVENTORS

Hans Progler
Wilhelm Samaga
Hermann Ehms
Rudolf Eickemeyer

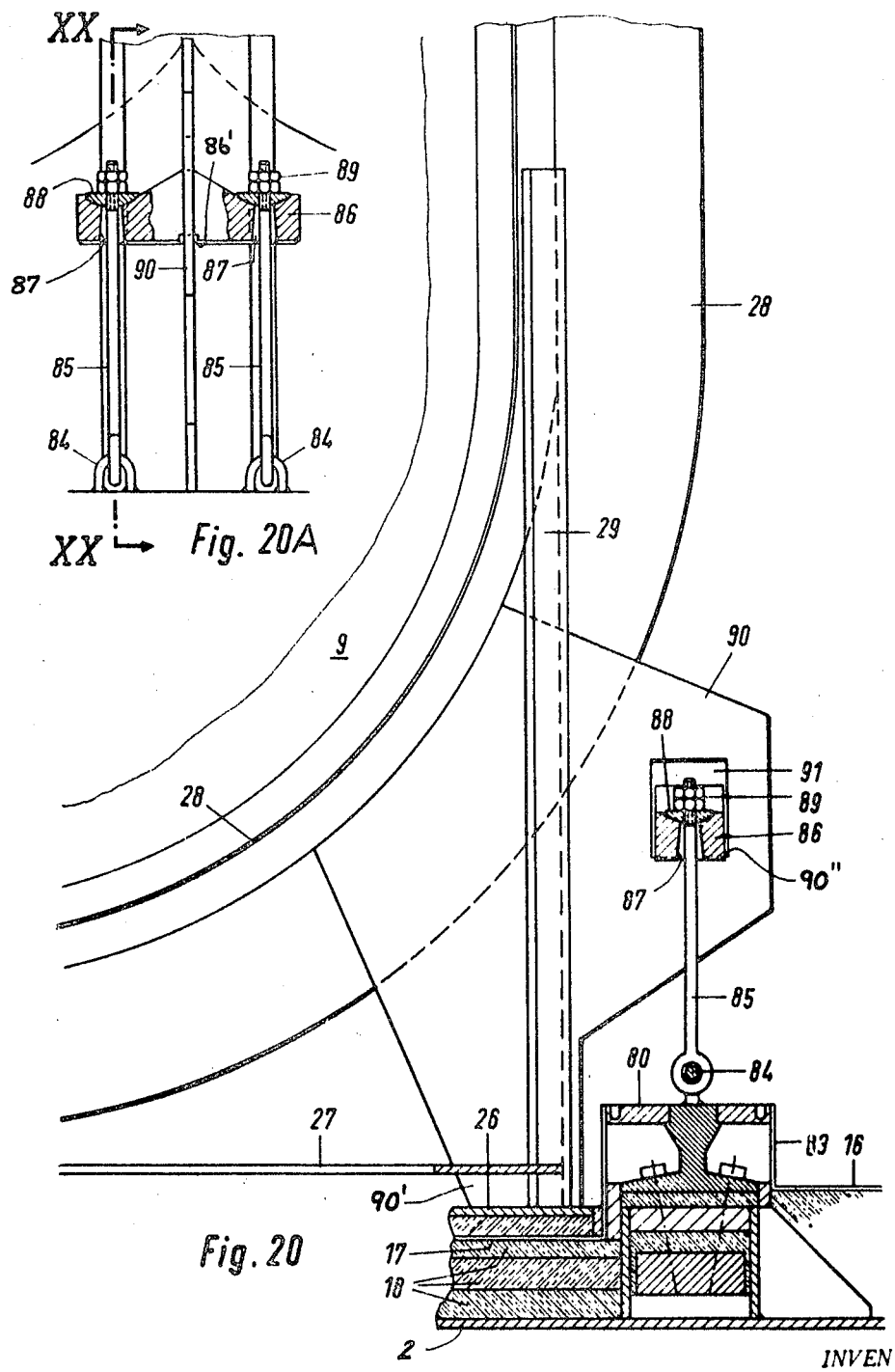

United States Patent Office 3,459,148
Patented Aug. 5, 1969

3,459,148
TANKSHIP FOR LIQUEFIED GASES
Hans Progler and Wilhelm Samaga, Trostberg, Hermann Ehms, Munich-Solln, and Rudolf Eickemeyer, Munich, Germany, assignors to Linde Aktiengesellschaft, Holl- riegelskreuth, Germany, a corporation of Germany
Filed Aug. 29, 1967, Ser. No. 664,066
Claims priority, application Germany, Sept. 1, 1966, L 54,440
Int. Cl. B63b 25/14, 3/26
U.S. Cl. 114—74                    21 Claims

ABSTRACT OF THE DISCLOSURE

A tankship for the transportation of liquefied gas whose hull forms a hold provided with a floor and contains a plurality of tanks for the liquefied gas mounted on the floor in respective compartments within the hold and thermally insulated therefrom while having a lower wall spaced above said floor and a continuous sheet-metal skin disposed intermediate each tank and the hull, the skin being composed of plates welded in fluid-tight relationship together along their peripheries and accommodating expansion and contraction. The floor of the hull and the tank are provided with mating parallel arrays of shear-rail assemblies supporting said tank in weight-transmitting relationship with the hull while thermally insulating the tank therefrom.

---

Our present invention relates to tankships for liquefied gasses and, more particularly, to tankships for carrying gases capable of low-temperature liquefaction in a number of individual tanks.

In the commonly assigned U.S. Patent 3,314,567 issued to one of the present joint inventors jointly with another on Apr. 18, 1967, there is described and claimed a storage container for liquid materials which has corrugated rectangular parallelepipedal or trapezium-shaped prismatic configurations composed of bulging sections which are outwardly convex and so tied together as to be capable of withstanding pressures, force-transmission means between the container and the walls of a tankship hull. More specifically, such assemblies consist of fluid-retaining vessels of generally prismatic configuration having at least two pairs of mutually opposite lateral walls constituted of a plurality of outwardly convex laterally contiguous parallel cylinder sections which are welded together directly or via reinforcing intermediate members adapted to bond these outer walls with inner walls of complementary or smooth configuration in the formation of dual-wall structures having high heat-barrier properties. These walls may be spanned by reinforcing plates which limit sloshing within the container and which tie the walls together to resist the outward stress applied by liquid pressure from within. Special support means may be provided between the walls of the generally prismatic container and the hull to accommodate thermal expansion and contraction without stressing the container walls and to retain them in place in the ship hull with a minimum of force transmission from the walls to the hull and vice versa. These outwardly convex sections may be provided so as to preclude lateral movement of the tank within the ship. While such arrangements have proved to be most advantageous for many purposes, it has been found that the system for mounting the prismatic containers whose lateral walls, edges and corners are composed of outwardly bulging convex cylindrical or conical shell sections attached continuously to one another, have been expensive, complex and incapable of withstanding all of the stresses to which the support and positioning means are subject. This is especially the case when a number of containers are to be disposed in a common hull.

It is, therefore, the principal object of the present invention to provide a tankship having a plurality of containers for liquefied gases in which the containers are mounted in an improved fashion by comparison with earlier systems, especially in the vessel hull.

A further object of this invention is to provide an improved tankship and tank construction for the transportation of low-temperature liquids and especially liquefied gases such as air rectification products, liquid ammonia and liquid hydrocarbons of low carbon number.

These objects and others which will become apparent hereinafter, are attainable in accordance with the present invention by providing a tankship having below its deck an elongated hull space longitudinally subdivided by vertical partitions into a plurality of individual compartments, each of which receives a respective liquid container whose walls are generally parallel to those of the respective compartment and are relatively close thereto, while conforming generally to the configuration of the space enclosed by this compartment; the walls of each container are composed of contiguously interconnected generally parallel shell sections forming an outer wall structure, the sections being outwardly concave, while an inner wall structure is spacedly connected to the outer wall structure and defines a respective compartment for the liquefied gas. The vertical walls are composed of upwardly extending cylindrical shell sections having vertical generatrices and terminating in quarter-spherical end sections providing a transition to the horizontally extending sections forming the horizontal walls. The intermediate longitudinal and transverse intermediate partitions between these sections which constitute slosh-preventing plates as well as tension-resisting members between the outwardly convex sections are here elongated and extend into the spaces between the convex sections walls of the tank and the generally parallel walls of the individual compartments. These extensions of the intermediate and transverse partitions are, moreover, formed as shear rails which are received in respectible longitudinally extending recesses, grooves or channels along the walls or hull for sliding movement therein upon thermal shrinkage and expansion, and to accommodate shrinkage or yielding of the walls of the vessel. These rails are, moreover, connected by tension bands to the intersections of extensions of the partitions to maintain a predetermined spacing.

According to a further feature of this invention, a circular rail is provided at the intersection of the longitudinal and transverse rails with substantially identical cross-section whose inner flanks bear via a compression-resistant intervening layer of insulating material (e.g. a fabric-reinforced synthetic resin such as that marketed under the name Ferrozel) upon the inner wall of the hull.

The above and other objects, features and advantages of the present invention will become more readily apparent from the following description, reference being made to the accompanying drawing in which:

FIG. 1A is a side-elevational view, partly in diagrammatic form and broken away of a tankship embodying the present invention;

FIG. 1B is a plan view of the tankship with its deck removed;

FIG. 2A is a cross-sectional view of the bottom support of a tank according to the present invention, taken generally along the line IIA—IIA of FIG. 2B;

FIG. 2B is a cross-sectional view taken along the line IIB—IIB of FIG. 2A;

FIG. 3 is a detail view drawn to an enlarged scale of a rail and channel support;

FIG. 4 is a plan view of the rail channel according to this invention;

FIG. 5 is a cross-sectional view taken along the line V—V of FIG. 4;

FIG. 6 is an elevational view of another barrier and rail system according to this invention;

FIG. 6A is a cross-sectional view taken generally along the line VIA—VIA of FIG. 7;

FIG. 7 is a plan view of the rail and channel system of FIGS. 6 and 6A;

FIG. 8 is an elevational view, partly in section, along the line VIII—VIII of FIG. 10, of another embodiment of this invention;

FIG. 9 is a cross-sectional view along the line IX—IX of FIG. 10;

FIG. 10 is a plan view of this latter embodiment;

FIG. 11 is a cross-sectional view of the underside of a liquid-gas tank showing the pedestal arrangement for supporting the tank upon the floor of the ship;

FIG. 20 is an elevational view somewhat in cross-section along the line XX—XX of FIG. 20A, of another tension-anchoring system; and FIG. 20A is a detail view of this system.

Figure 12:
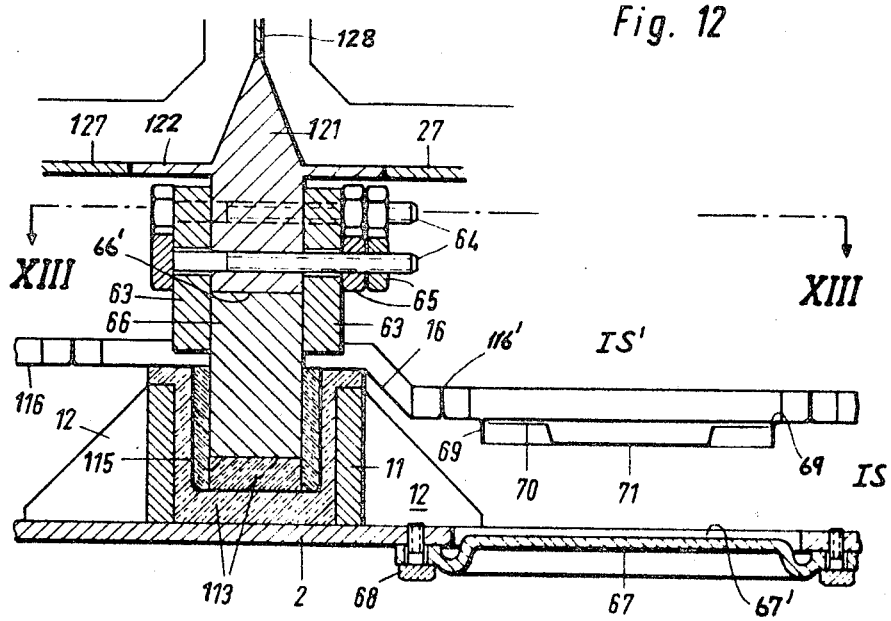
FIG. 12 is a cross-sectional view along the line XII—XII of FIG. 13 of another mounting assembly.

In FIGS. 1A and 1B, we show a tankship whose outer hull 1 is provided with a bow portion 1a and a stern portion 1b, the latter having the usual direct-controlled rudder 1c and propulsion screw 1d in a rear compartment of the hull, represented at 1e, for example, the ship is provided with a prime mover (e.g. a steam engine or an internal-combustion engine) and may have above deck a superstructure (not shown) forming the navigation compartmentt, radio room and crew quarters. The outer wall 1 is spaced outwardly of an inner wall shell represented generally at 2 which forms a compartment 2a between the inner and outer wall shell while partitions 1f subdivide the hull longitudinally into compartments 1g, each receiving a respective liquefied-gas tank 3–8, respectively. Six of these tanks are illustrated in the present system.

The tanks may have generally rectangular plan views (cf. tanks 5 and 6) or may be of trapezoidal configuration (tanks 3, 4, 7 and 8) designed to conform to convergencies of the starboard or port walls 2b of the inner hull shell 2. Thus the walls 2b along the flanks of the compartments 1g at the front and rear parts of the vessel taper more or less sharply toward one another and the corresponding walls of the tanks 8 and 3 have corresponding convergencies while the more inwardly located tanks 4 and 7 converge to lesser extents. The tanks may be constituted generally as described and illustrated in the commonly assigned U.S. Patent 3,314,567, issued Apr. 18, 1967. Thus these tanks are constituted of outwardly convex walls, bottom and top sections 9a or 9b which are joined along their longitudinal seams to contiguous sections by welding or with T-shaped transition sections 9 which extend across the tank and form tension elements holding the tank walls in their pre-established relationship. As thus constituted, it will be apparent that each tank is of generally prismatic configuration and has at least two pairs of mutually opposite lateral walls with the walls of each pair extending generally transversely to the walls of the other pair. Each of the walls is constituted by a plurality of vertically extending laterally contiguous outwardly convex sections 9, each having at least one vertical junction 9c with an adjacent section corresponding to a common intersection of the mutually adjacent sections and being part of a cylindrical surface. As will be apparent hereinafter, support means is provided externally of the tank in engagement with the wall thereof at the junction of these cylindrically bowed sections for restricting outward lateral flexing of the walls while tension means, including antislosh partitions, span the walls between otherwise contiguous sections. The upper and lower walls of the tank may likewise consist of longitudinally extending, outwardly bowed cylindrical sections contiguously interconnected at their intersections while corner sections of similar curvature are provided at the corner of the tank and between the vertical sections of the lateral walls and the horizontal sections of the roof and bottom walls. All of the sections have substantially identical radii. Generally, the tanks are of double-wall construction as is described in greater detail hereinafter.

In FIGS. 2 A and 2B, we show the means whereby the tanks mounted upon the outer hull shell at the floor of the vessel in accordance with the principles of the present invention. Thus, FIGS. 2A and 2B represent a plan view and a vertical section through the bottom supports of a tank whose outer cylindrical shell members are represented at 28, it being understood that these cylindrical, outwardly domed and contiguously adjoining sections may represent the bottom wall of any of the tanks 3–8 and may constitute with an inner wall a tank structure of the type described in the last-mentioned patent. Thus the sections 28 are welded at 28' by respective weld seams to a T-shaped member 28a whose arms 28b respectively are joined to the mutually adjacent members 28 of the outer shell while the corresponding arms 28c are connected to shells 28'' of the inner wall. The shell 28d of the T-shaped member 28a is welded at 28e to the partition walls 28f traversing the tank while a stem portion 28g of the T is welded at 28b to a support wall 25.

FIG. 2A is a plan view of the support system extending over only about a quarter of a bottom wall of the tank and, to facilitate understanding of how the support structure is integrated into the ship's hull, it may be noted that the dot-dash line 10 represents the longitudinal axis of the ship while the dot-dash line represents a vertical median plane through the tank perpendicular to the axis 10. The structure described hereinafter with reference to FIGS. 2A and 2B will be understood to be symmetrically disposed on both sides of the longitudinal axis 10 and the transverse axis 10'. On both sides of the longitudinal axis 10, the floor of the inner shell 2 of the ship's hull is provided with longitudinal ribs 11 (right-hand side of FIGS. 2A and 2B) which are upstanding from the floor of shell 2 and are stiffened by transverse webs 12. On both sides of the transverse axis, corresponding upstanding plate-like longitudinal ribs 11a are provided with similar reinforcement with corresponding reinforcing webs 12a. The longitudinal seams between the ribs 11 and 11a and the shell 2 are joined by welding as are the seams between the webs 12 and 12a and the respective ribs 11, 11a. At their ends, below each tank, the ribs 11 and 11a, which are of cruciform arrangement (FIG. 2A) are joined by further ribs 11' and 11a', respectively, which are stiffened by webs 12', 12a, respectively. The troughs 11b and 11b', formed by the longitudinal and transverse ribs 11 and 11a, are lined with slabs 13 of a load-supporting rigid thermal insulation of the reinforced-resin type marketed under the name Ferrozel (Ferrocell), between the slabs of which a metal hood 15 is imbedded. The upper edge 15' of the U-shaped hood is welded to plates 16 parallel to shell 2. A channel-like profile 14 of aluminum or stainless steel is received in the insulating slabs within the trough.

Figure 16:
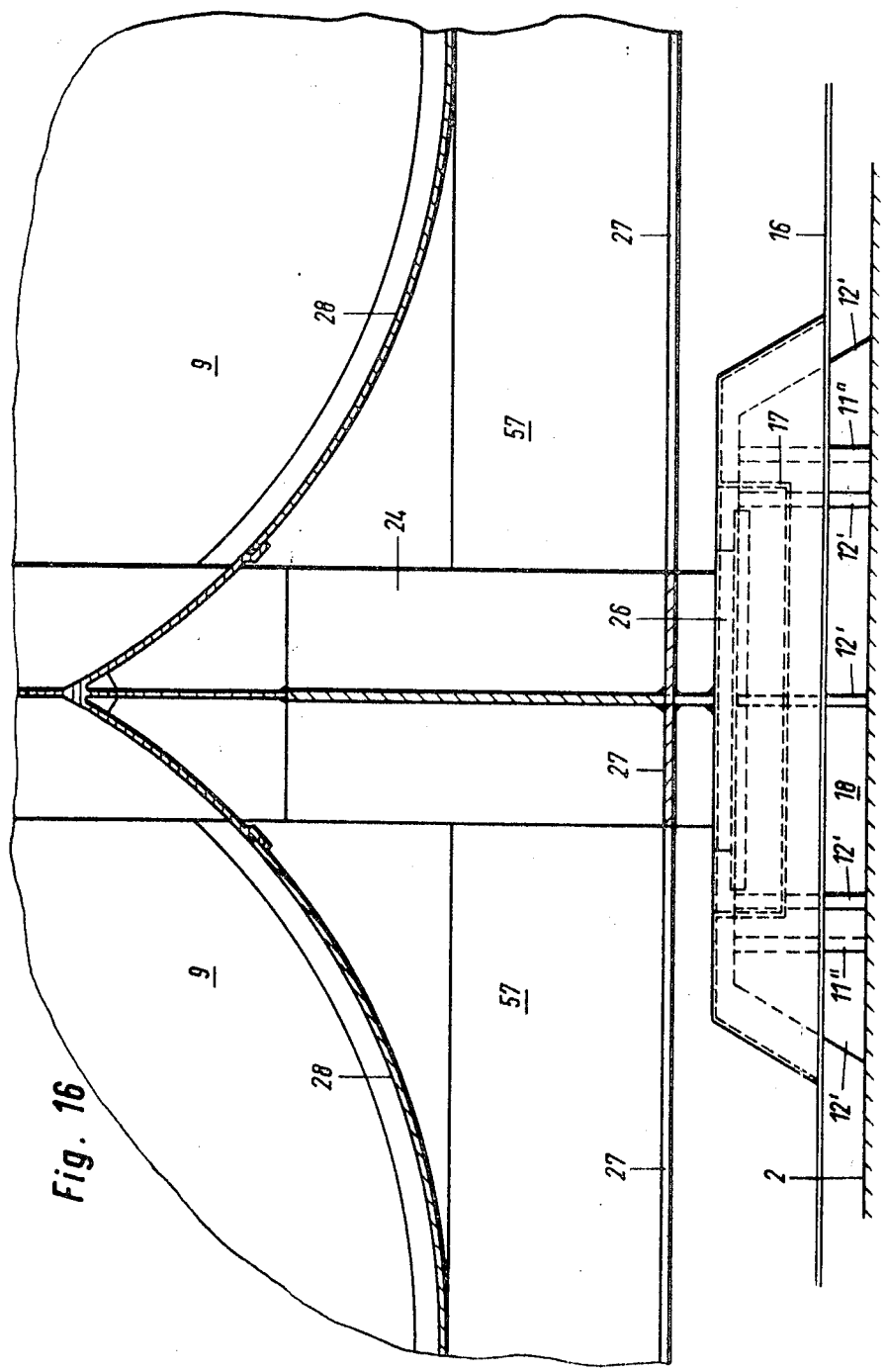
FIG. 16 is a cross-sectional view similar to FIG. 11 and taken along the line XVI—XVI of FIG. 17, illustrating still another support structure at the base of the tank.
Figure 17:
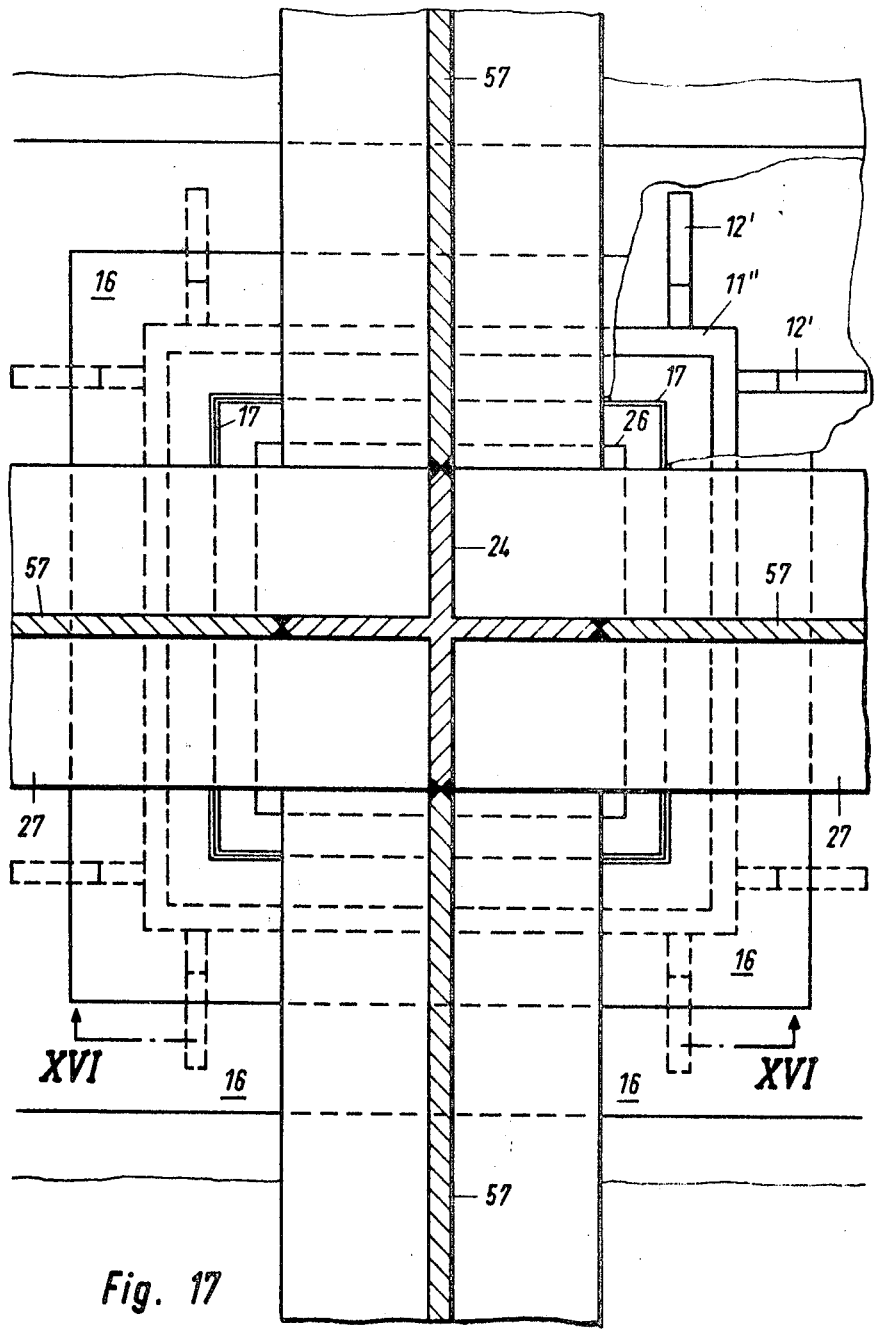
FIG. 17 is a cross-sectional plan view of this support structure.

The extensions 28g of the transition members 28a extending downwardly from the tank wall formed by member 28 are mounted upon "feet" 11" welded onto the inner surface of the hull wall 2 and provided with vertical stiffening ribs 12". Within each of these feet 11", there is provided a bed composed of multiple layers of load-supporting and thermal insulation 18 which is reinforced by a U-shaped metal inlet represented at 17 and having its uppermost edges welded to the sheet-metal skin 16 so that a so-called second barrier is provided between the hull wall 2 and the tank wall formed by the members 28 (cf. FIGS. 16 and 17). The sheet-metal plates 16 forming the "second wall" or intermediate liquid-tight barrier are thermoelastic and are composed of aluminum or stainless steel and form an upper covering for a layer of load-supporting thermal insulation 19 filling the space IS between the hull wall 2 and the metal skin 16. Above this skin, a further layer of insulation 20 is disposed in the insulating space IS'. This latter layer can be a nonload-supporting material, generally a comminuted or powdered thermal insulation loosely filled onto the skin 16 or tamped thereagainst. Powder, fibrous or packed insulations of the type described in "Evacuated Powder Insulation for Low Temperatures," Volume 1, pages 63–84 (Progress in Cryogenics), are suitable.

In the channel formed by members 14, a shear rail 21 is inset via the lateral flanges 22 thereof. These lateral flanges of the shear rail 21 rest upon the upper edges of the channel member 14. The shear rail 21 is welded to and provided with upwardly extending wall members 23 which are welded to the extensions 28g of the transition pieces as, for example, is illustrated at 28h' in FIG. 2B. At the intersection points of the support walls 25 rising from the 11", cruciform-shaped profile members or double angles 24 are welded to reinforce the junctions and then serve as transition members. Thus, member 23 may be welded to the cruciform transition piece 24' of FIG. 2A at locations 23a and 23b while the intersecting walls 25' and 25" are welded to the other arms of this cruciform member at 23c and 23d, respectively. The base of each of the cruciform profiles 24 is provided with a bottom plate 26 which rests upon the multi-layer load-supporting insulation plates 18 previously described. To effect force and load transfer from the intermediate walls 28f of the tanks to the shear rail 21, the individual cruciform profiles 24 are interconnected by the tension bands or webs 27 or 27' of sheet metal, these bands being tied to the rail flanges 22 parallel to the longitudinal and transverse axes 10 and 10' of the ship. To distribute the force arising during rolling movement of the ship more uniformly over the length of the rail 21 parallel to axis 10, the tension bands 27 anchored thereto are widened at the extremities joined to the flange 22 as represented at 27a until the anchor point extends substantially continuously the full length of the rail 21 as indicated on the right-hand side of FIG. 2A. At the outer edges of the tanks, the support walls 23 and 25 are provided with inwardly open channel profiles 29 of trapezoidal configuration which extend generally transversely of the plates 23 and 25 to stiffen the latter at their outer ends while being anchored to the tank at the junction between the outwardly bulging sections as additional reinforcements. These upright members 29 are provided all along the outer periphery of the mounting assembly represented in FIGS. 2A and 2B and may be welded to the peripheral tension members 27c, 27d and 27e located along the periphery and functioning similarly to the member 27 and 27' previously described.

In FIG. 3, we show a detail of the support structure for the guide rail in accordance with a modification of this invention in which the channel-like member 14 is here subdivided into a pair of outwardly turned angle members 14' flanking the base 21a of the rail 21. Each of the members 14' thus has a laterally extending flange 14a' overlain by a corresponding lateral flange 22 of the rail 21, the latter being welded to the tension bands 27 at 22a. The dependent shanks 14b' of each member 14' widens downwardly complementarily to the downward convergence of the base 21a of the rail. Above the flanges 22, the rail converges upwardly at 21b and is provided with an extension 21c which is welded to member 23 as previously described at 21d. The members 14' are longitudinally separated but are retained in position by U-shaped springs 30 whose bight portions 30a underly the base 21a of the rail and whose arms 30b are received in respective grooves 14c' of the members 14. Thus the members 14' are urged outwardly to clamp the insulating plaques 13 against the ribs 11 and lock them in place while retaining the members 14' in their spaced relationship. Thus, the rail can be readily removed vertically (i.e. in the direction of arrow A) or inserted in the opposite direction and can shift limitedly as is described in greater detail hereinafter. From this figure, it can also be seen that the metal skin 16 is provided with upwardly turned portions 16' which retain the powder insulation 20 against movement and further stiffen the structure. For further reinforcement, the vertical webs 12 can be joined to the longitudinal ribs 11 by weld seams 11i while they are affixed to the shell 2 by weld seams 12i. Horizontal stiffeners 31 are welded at seams 31i to the members 11 and 12. In this embodiment, a pair of horizontal plaques 13a and 13b form part of the insulation bed supporting members 14' and span the entire width of the trough 11b. The walls of this trough are flanked by a pair of vertical plaques 13c and 13d against which the channel member 15, which is welded to the plates 16, rests. Inwardly of this channel member 15, three plaques of load-bearing insulation are provided on each side of the rail 21 as represented at 13f–13h and 13i–13k, respectively.

In FIGS. 4 and 5, we show another system for anchoring the shear rails 21 to the floor of the ship's hull. In this embodiment, the channel-shaped member 14 or 14' is replaced by a trough-like structure 14" whose channel 14a" diverges upwardly to receive the downwardly convergent base 21a of rail 21 which is welded to the members 23 and 27 as previously described. The channels 14" are provided between sets of edge supports while a cruciform channel member 14''' with upwardly divergent flanks 14a''' form sockets receiving the downwardly tapering base 21a of the respective shear rail. Trough-like reinforcements or stiffeners 32, 32' are received within the channel-shaped members 14" and 14''' (FIG. 4) to receive the shear rail 21. These members may be subdivided longitudinally and retained by springs of the type illustrated in FIG. 3. The thermoelastic metal skin 16" is here welded to the relatively thick flange edges of the trough-like members 14" and 14'''. The upwardly bent edges 33 of the metal skin 16, which are represented at 16' in FIG. 3, are elastically joined at their corners to (sheet metal pans 34 whose edges intersect the edges of the plates at angles of 45° (FIG. 4). The pans 34 and the adjoining corners of the plate 16" are secured to the inner surface of the ship hold 2 by bolts 35 of low thermal conductivity. The lateral flanges 14b" and 14b''' are provided with lateral sheet-metal portions 37a along the edges of these flanges, the portions 37a having upwardly bent ends 37 running parallel to the edges of the flanges of troughs 14" and 14'''. These upwardly bend edges 37 are connected to the correspondingly bent edges of the plates 16" of the sheet-metal skin and, at the intersection points of the junction 37 and 33 between the trough parts 14" and 14''', the corners are bent at 45° angles and sheet-metal pans of diamond configuration are inserted by welding. In this fashion, the thermoelastic metal skin 16 is connected to the trough elements 14" and 14'''. It will be understood that the connection system for the thermoelastic skin 16 of the FIGS. 1–3 can be tied to the trough-like sockets 14 and 14' in a similar manner, the upwardly bent edges of the skin 16 being represented at 16', as noted earlier.

As can be seen from FIGS. 6, 6A and 7, the channel-like socket 14 designed to receive the downwardly tapering base 21a of the shear rail 21, can be constituted from a pair of longitudinally subdivided angle members 39. The angle members 39 are provided on their undersides and inner flanks with grooves 40 designed to receive the connecting lips of the sheet-metal skin to facilitate the joining of these lips by welding. In this embodiment, the individual sheet-metal plates 41–45 underlie the lateral flanges of the angle members 39 and are joined together to form a thermoelastic skin which is here designed generally at 16. The lips of these sheet-metal members are welded together within the recesses 40 previously described. Here, too, the upwardly bent marginal portions 47, 48 and 49 of the plates are cut at a bias (at 45°) at their intersection regions and are welded to square pans 46 to close the space provided by the bias cutting of the plates. The embodiments of FIGS. 8–10 represent still another arrangement for connecting the individual thermoelastic sheet-metal plates of the so-called secondary barrier to the shear-rail support. In this system a trough-shaped profile body is formed by angle members 39' (FIG. 10) and the latter are provided with edge grooves 40' in which the adjoining lips of the plate 41'–43' and 45' are joined by lap-welding techniques. In this system and in the system of FIGS. 5–7, the thermoelastic skin 16 etc. is welded also to the socket-forming members 14", 14''', 39, and 39'. In this system, the plates 41'–43' and 45' constitute connecting members of the type provided along the flange edges of the trough-shaped support in FIGS. 4 and 5 and are connected to the remainder of the plates of skin 16 at 37' along the edges of the lips 37a' and 37b'. It will be apparent that this method of joining the plate members into a substantially continuous second barrier not only provides a fluid-tight seal but also forms folds which render the skin elastically deformable under thermal action in its plane. The thermally expanded positions of the lips 37a' and 37b' are represented in dot-dash lines in FIG. 9. The confronting lower edges of the angle members 39' are provided with recesses 50 which accommodate the downwardly turned sheet-metal pans 51 on both sides of the length of the respective angle member 39' so that the recesses can be welded to the lower edges of the sheet-metal pans 51.

The approximately vertical sheet-metal connection plates 52 join the connecting plates 43' together and are welded on their undersides with the lower edges of the narrow sides of the sheet-metal walls 51. The angle members 39' are prepared, prior to their positioning in the troughs, to receive the shear rails with connecting plates 41–43 and 45' of the type generally described earlier in connection with FIGS. 5–7; in addition, connecting pieces 42 and sheet-metal pans 51 are provided. When the unit is mounted on the floor of the hull 2, only the weld seam 53 need be formed which connects the angle members in the longitudinal direction of the shear rails. The joining of the connection plates with the thermoelastic metallic skin 16 is effected via upwardly bent edge strips 54 of the plates and the connecting members, these upwardly bent strips or marginal portions being cut away at angles of 45° at their corners to receive square sheet-metal inset pans 55 whose upwardly turned marginal portions are welded to those of the connecting plates and the remainder of the thermoelastic skin 16. The arrow-side edges of the pans 51 can be provided with corrugations or outwardly bent protuberances 56, conforming to the connecting plates 52 for increasing the stiffness of the pans 51.

In FIG. 11, we show another support system at which the shear rails form the female members while the cooperating rail supports define upwardly converging tongues received in the downwardly divergent sockets of the shear rails. As in the systems described in FIGS. 1–10, the arrangement of FIG. 11 provides that the male member have flanks converging in the direction of the female member whereby the weight of the tank wedges the male member into the female to resist longitudinal displacement which, however, is limited permitted during expansion and contraction of the tank. In this embodiment 2, the longitudinal shear rail and the transverse shear rail are mounted upon extensions of the reinforcing plates and partitions of the tank and intersect one another at right angles at substantially the midpoint of the base of the tank and preferably in the vertical line of the center of gravity thereof.

Figure 18:
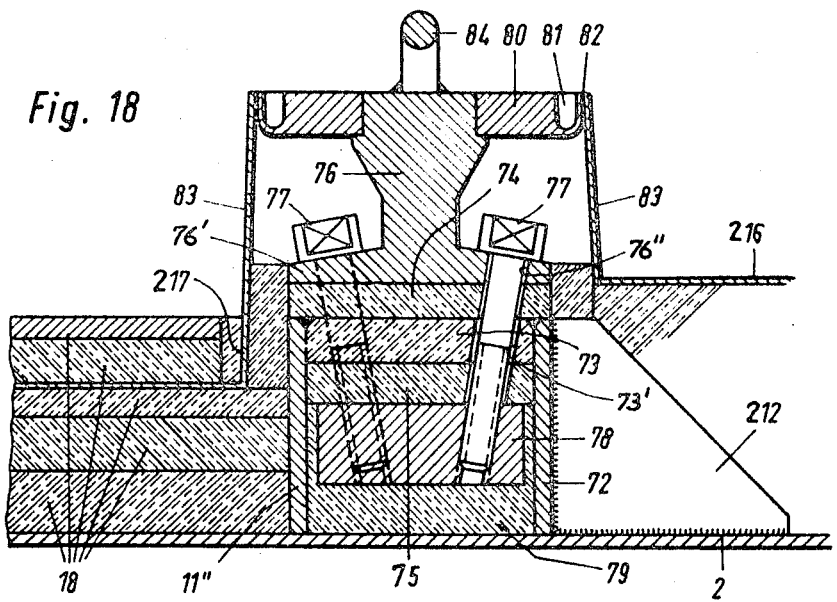
FIG. 18 is a cross-sectional view taken along the line XVIII—XVIII of FIG. 19, showing the anchoring means for a tension element at the floor of the ship in accordance with a particularly advantageous embodiment of this invention.
Figure 19:
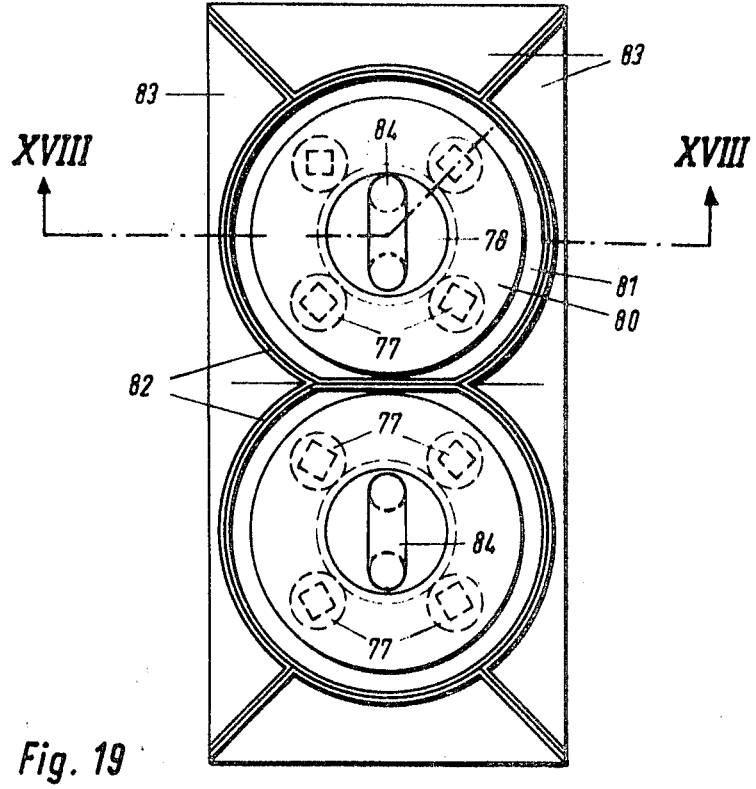
FIG. 19 is a plan view of this assembly.

More specifically, it can be seen that the tank is composed of cylindrical sections 9 which run perpendicular to the plane of the ship and are shown in vertical cross-section in this figure. The shell sections 28, which are joined by welding as described and claimed in the aforementioned patent, are interconnected and rigid with the partition or reinforcing walls 28f whose extension 23 is welded at 21d to the shear rail 21'. In this embodiment too, the cruciform members 24 reinforce the intersection points of the vertical walls forming the pedestals and shear rail connections. Tension bands 27, reinforced by vertical strips or flanges 57, are welded to flanks 22' of the shear rail 21' to retain the rails and pedestals 26 in their original spaced relationship. The longitudinal and transverse rails, which have the profile of rail 21' as illustrated in FIG. 11, form sockets 21z' whose flanks 21y' converge upwardly to receive the complementarily shaped tongue 58a which is longitudinally split and resiliently compressible to form a spring-loaded projection. Laterally of the male formation 58a, the support 58 is formed with lateral flanges 59 which are welded to the sheet-metal thermoelastic skin 16 via the upwardly bent portions 16' and connecting plates 37' as previously described. The pedestal or support 58 rests upon a horizontal plaque of load-supporting insulation 13a' which, in turn, is retained between longitudinal rails 11. Flanking the pedestal 58, we provide a pair of inner plaques 13h' and 13i' of load-supporting insulation, e.g. a fiber-reinforced synthetic resin such as Ferrocel, and a pair of outer plaques 13q' and 13j' respectively. Strips 13f' and 13k' of similar insulation are disposed between the flanges 59 and the rails 11. Pressure plates 60 may be spaced along the flanks of the rails and provided with screws 61 threaded into the ribs 11 to clamp the pedestal 58 in place. Reinforcing webs 12 of triangular configuration are provided at suitable locations along the ribs 11. As is also apparent from this figure, the pedestals or feet of the tank, which are longitudinally and transversely movable for expansion and contraction along the hull wall 2, are here formed in a manner similar to that previously described in connection with FIG. 2B. More specifically, it can be seen that extensions 25 are welded at 28h to the extensions 23 of the partitions 28f symmetrical on opposite sides of the longitudinal and transverse planes represented at 10 in FIG. 11. The vertical supports 25 are connected by the bands 27 with the remaining pedestal extensions of the lattice work so that the plan view of the system will correspond substantially to that of FIG. 2A. Here, however, member 25 at its lower portions 25z below the reinforcing band 27 and in line with the respective vertical cruciform intersection member 24, resets upon a bearing plate or foot 26z inset into the uppermost layer 18z of load-supporting (fiber-reinforced plastic) insulation. A trough 17 in which plaque 18z is received, as a flange 17z welded into the thermoelastic skin 16 along its edge as illustrated in FIG. 9 for the junctions between the plates of skin 16 and the connecting plates etc. Further layers of load-supporting insulation are provided at 18y, 18x and 18w between the walls 11" flanking the foot 26. Walls 11" are welded to the hull shell 2 and are reinforced by triangular webs 12' (see FIGS. 17 and 18).

Figure 13:
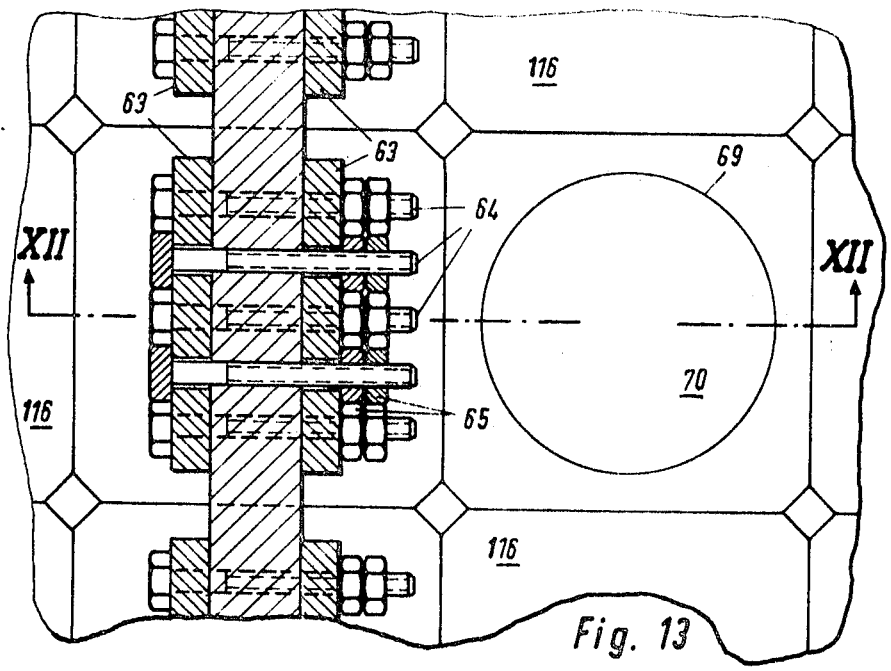
FIG. 13 is a cross-sectional view along the line XIII—XIII of FIG. 12.

FIGS. 12 and 13 show another modification of the means constituting the shear rail and for attaching the shear rail to the tank and its channel to the hull of the ship. Here, the shear rail 121 is affixed to the partition 128 of the tank and has flanges 122 welded to band 127 in the manner previously described. Along both flanks of the shear rail 121, there are provided lobes 63 attached to the shear rail 121 via bolts 64 which are tightened via nuts 65 in a counternut locking arrangement. In this case, the shear rail 121 and the lugs 63 flanking same and projecting downwardly therebeyond from a channel 66' receiving the upstanding portion of a bearing rail 66 which is continuous while the lugs 63 are spaced therealong in respective seats (see FIG. 13). This construction has the advantage that the bearing rail 66 can, prior to insertion of the tanks in the ship's hull, be anchored to the hull plate 2. When the tanks are placed in position, the lug 63 can be loosely mounted upon the rail 121 until this rail is properly seated upon the bearing member 66 whereupon the bolt assembly 64, 65 is tightened, e.g. via manholes or access ports 67' in the hull plate 2 which are closed by cover 67 sealingly engaging the hull plates 2 and tightened by screws 68. Similarly the continuous intermediate skin 116, overlain insulation-containing compartment IS between itself and the hull 2 of the ship, are welded together via the upstanding flange 116' in a liquid-tight barrier including the sheet-metal channel-shaped inlays 115 received between the plaques 113 of load-supporting insulation.

To permit access to the bolt assembly 64, 65, etc. the skin 116 is provided with an access port 69' defined by a downwardly extending flange 69 in which the cover 70 is received, this cover being formed with a handle 71. While any releasable closure means, e.g. a bayonet coupling, can be provided between the cover 70 and the sheet-metal skin 116, it is preferred to weld the annular seam between them in a liquid-tight manner. Should it be necessary to release or tighten the bolts 64 and 65, the manhole 67' is opened by removal of cover 67, the insulation filling the space IS is removed through the manhole, the weld seam securing cover 70 in the skin 116 is ground away or otherwise broken or the cover 70 is rotated to release it. Any additional insulation between the receptacle walls and the barrier 116, i.e. the insulation within the space IS', is withdrawn and wrenches or the like can be inserted through the opening 69' to tighten or adjust the bolt assemblies 64, 65. It has been found to be especially convenient not to tighten the covers 67 and 70 upon initial positioning of the tank, but to draw the bolt assembly 64, 65 in and only after proper seating is assured to complete the clamping operation. During the initial tightening stage, the covers 67 and 70 can be held in place loosely (e.g. via bolts 68 and tack welds), the covers being removed to enable final tightening. Thereafter, the cover 70 is welded sealingly into the skin 116.

In FIGS. 18, 19, 20 and 20A, we show anchoring means for securing the tank 9 to the hull of the ship, the anchoring means being designed to take up vertical stress generated upon rolling of the ship. This anchoring means includes tension elements designed to hold the tank down with its shear rail retained in the respective channels. In this system, the ship's hull 2 is provided with a further longitudinal rib 72 parallel to and outwardly of the rib 11' described earlier (FIG. 18). Above the hull 2, there are provided plaques 18 of load-supporting therman insulation in which is embedded the sheet-metal intermediate barrier or skin 216 and 217. In the channel formed between the ribs 11" and 72, we provide a cup-shaped body 79 of thermal insulation which receives a threaded anchor plate 78 of stainless steel. Between this anchor plate 78 and a plate 73 welded to the ribs 11" and 72, another plaque 75 of load-supporting thermal insulation is provided. The rib 72 is stiffened against the hull plate 2 by webs 212 welded to the hull 2 and the rib 72. Above the stainless-steel plate 73, a further plaque 74 of load-supporting insulation is disposed to carry two stainless-steel pedestals 76 of axially symmetrical configuration and, preferably, turned on a lathe. The lower frustoconical flanges 76' of these pedestals are provided with inclined bores 76" through which stainless-steel bolts 77 extend and are threaded into the anchor plate 78 while passing through suitable apertures 73 and insulating plates 74 and 75. The assembly 75, 78 and 79 is inserted laterally into the channel formed between the plate-like ribs 11" and 72. The bores 73' through which the bolts 77 pass, have diameters greater than the corresponding bores 76" and the shanks of the bolts 77 so that there is no metal-to-metal contact between the bolts and plate 73. This assembly thus provides an anchorage for the pedestal 76 to the hull plates 2 of the ship without thermal conduction between them.

Upon the stainless-steel pedestal 76 is press-fitted or shrunk an aluminum plate 80 having an upwardly open peripheral groove 81 forming lips 82 which are welded to connecting sheet-metal transition pieces 83 of the liquid-tight intermediate barrier 216 which otherwise is constituted as previously described for the barrier or skin 16 and 116. The pedestals 76 are provided with stainless-steel eyes 84 which receive the anchor rods 85 in a chainlike junction (FIGS. 20 and 20A). The anchor rods 85 of each pair of adjoining pedestals 76 pass upwardly through bores 87 in a yoke 86 in which they are tensioned via a washer 88 and countertightened nuts 89. The washers 88 and the yoke form a generally spheroidal thrust-bearing assembly permitting relative movement of the rods 85 and the beam 86 with 2° of freedom in directions transverse to the rods. The yoke 86 passes through and is received in an opening 91 in a plate 90 welded to the wall of the tank 9 and having a foot portion 90' resting against a floor plate 26 carried by the load-supporting insulation plaques 18. The yoke 86 is, moreover, provided with a notch 86' into which the edge 90" of the opening 91 fits with play to permit pivotal movement of the yoke 86 about this edge. Of course, modifications of this construction can be used in which only one pedestal is provided with an eye 84 and a shackle is received therein and has its shackle bolts anchored in the opening 91 of plate 90 (see German Industrial Standard DIN 5684, page 2).

Figure 14:
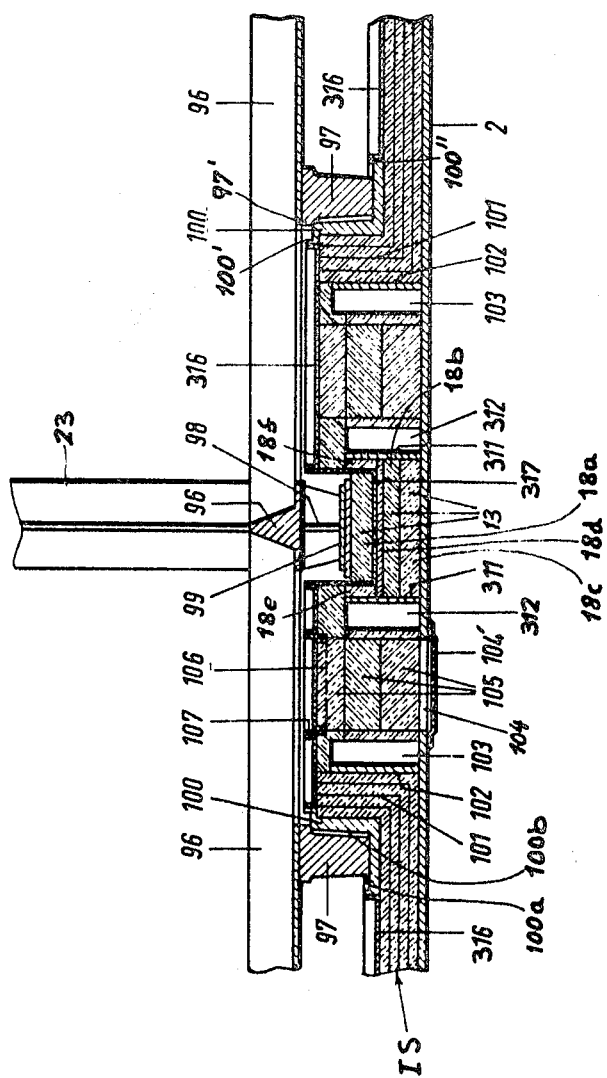
FIG. 14 is a cross-sectional view of the mounting structure according to another feature of this invention, taken along the line XIV—XIV of FIG. 15.
Figure 15:
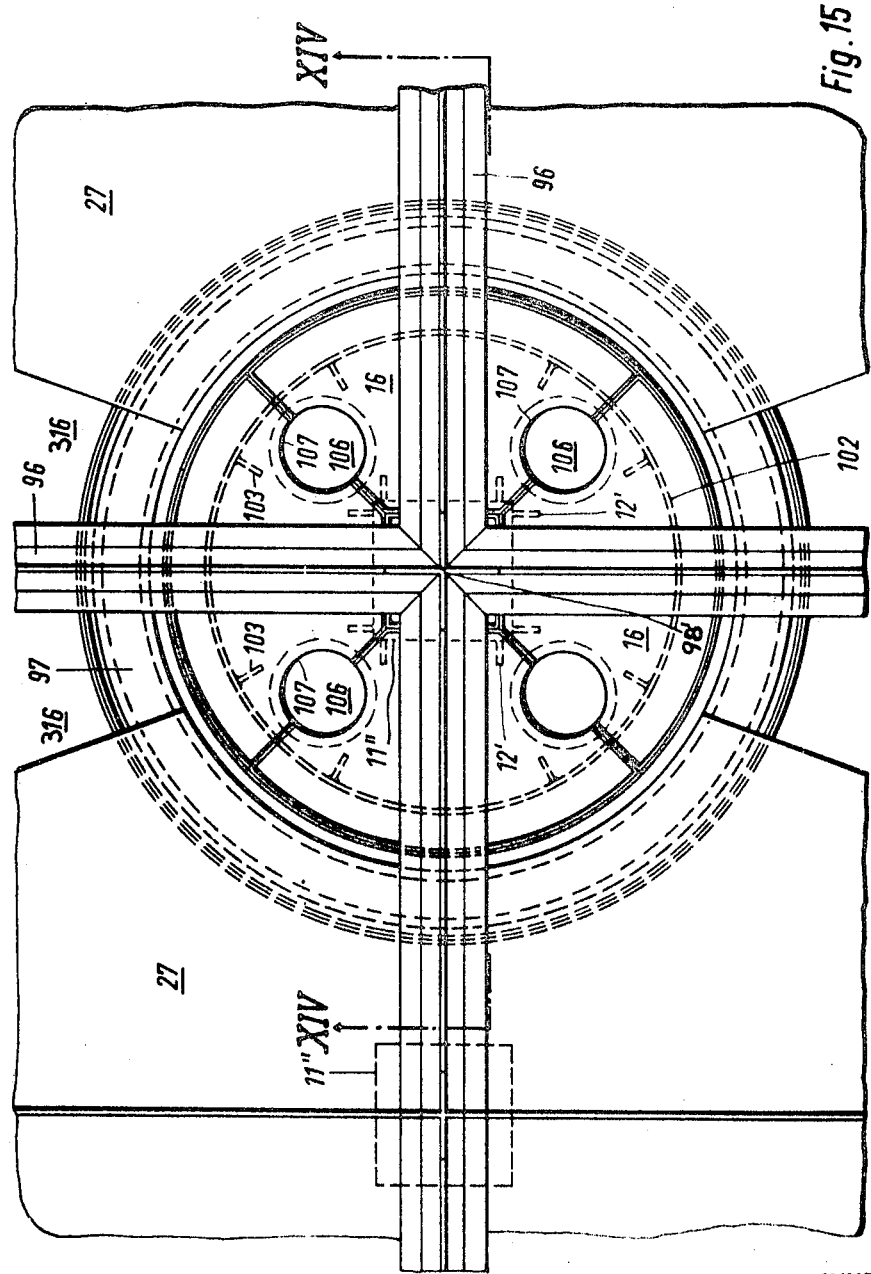
FIG. 15 is an elevational view of the ring assembly.

In FIGS. 14 and 15, we show another configuration giving excellent results in the support of the tanks on the floor of the hold, the mounting means here including a pair of shear rails 96 on the bed of the tank which have an intersection point 98' upon which is centered a circular rail 97. Rail 97 is welded to rails 96 and depends therefrom while having a support foot (FIG. 14) in line with the cruciform-section bar 23 of the tank and a cruciform profile member 98 terminating in a footplate 99. Members 97 through 99 are welded together. As described previously in connection with the pedestals or feet of the tank, the footplate 99 rests upon a plaque 18a of load-bearing insulation which forms part of a bed of such insulation through which the trough-shaped metal skin 317 extends and is welded by an upwardly bent flange to the thermoelastic sheet-metal skin 316 which has been described earlier in connection with the liquid-type continuous intermediate barrier 16, 116 or 216. Thus a trough is formed by the upwardly extending plate-like ribs 311 which are reinforced by transverse ribs 312, the trough also containing plaques 18b and 18c of load-supporting thermal insulation. The thermal insulation may here be of the Ferrocell type, while a further layer 18d and plates 18e and 18f of load-bearing insulation flank the trough-shaped portion 317 of the skin. Consequently, the intermediate barrier 316, 317 extends substantially unbroken across the floor 2 of the ship.

The annular rail 97 rests upon a horizontal flange 100a of an angle-profile seating ring 100 whose upright flange 100b extends parallel to a flank of the annular rail 97 and forms therewith a small clearance, thereby affording the necessary minute play to accommodate expansion and contraction of the interfitting members and to permit the ring 97 to be seated easily on the upstanding boss formed by the flange 100c. An internal rim 97' of ring 97 rests upon the seating ring 100. The latter, in turn, is formed with lips 100′ and 100″ which extend parallel to the upwardly turned flanges of the plates of the sheet-metal skin 316 and are welded thereto to maintain the thermoelastic character and continuity of the latter. The seating ring 100 also rests upon a laminated bed of load-supporting thermal insulation as represented at 101, this bed lying between the metal skin 316 and the floor 2 of the ship around the foot 98, 99 previously described. The laminated-insulation bed 101 also is provided along its inner periphery (centered on the foot 98, 99) with an annular rib 102 welded to the floor 2 of the ship's hold; the rib prevents horizontal movement of the laminated insulation bed. The annular rib 102 is, in turn, stiffened by a plurality of angularly equispaced radial ribs 103 (FIG. 15). It has been found that it is convenient to mount the tanks upon the seating rings 100 by lowering them in place before welding the annular rib 102 to the floor 2 of the ship's hold. After the rails 96, the feet 98, 99 and the annular rail 97 have been properly positioned by lowering the tank into the hold, the annular rib 102 can be welded in place through access port 104 in the floor 2 within the region surrounded by rib 102. Covers 104′, which can be temporarily held in place during the lowering of the tank (as described in connection with FIGS. 18, 19, 20 and 20A), can then be removed, the webs 103 and rib 102 welded from within to the upper surface of the floor 2, and plaques 105 of load-supporting insulation inserted between the skin 316, 317; the covers 104′ are then replaced and welded shut. The manholes or access ports 104 are, in turn, spaced around the foot 98, 99 at angles of 45° from one another, at least 4 such manholes being provided with 45° offset from the rails 96.

It has also been found to be advantageous to provide the thermoelastic sheet-metal skin 316, 317 with manholes in registry with the access port 104 (i.e. directly thereabove) and which can be closed by covers 106. The latter have collars 107 which may be welded to the downwardly turned flanges of the surrounding portions of the skin 316, 317. In this manner, it is possible to adjust the position of the rails 96, 97 from below before welding the cover 106 within the insulation space IS and positioning the insulation plaques 105.

It is noted earlier that the load-bearing areas of compartment IS are provided with plates, slabs or plaques of load-supporting insulation of the pressed-fiber, filled-cell honeycomb pressed fiber board, fiber glass or resin-filament reinforced type, e.g. a fiber-reinforced vinyl formaldehyde resin. Between regions of load-supporting insulation, the space IS between the thermoelastic metal skin 16, 116, 216 and 316 may be filled with a packed insulation or a relatively non-coherent material. Suitable insulations for this purpose are laminated pressed-fiber paperboard, slabs of paperboard filling the compartment and the like. It has been found to be advantageous to fill the space, alternatively, with corrugated or cellular paperboard layers as well as honeycomb paperboard insulation. In accordance with a specific feature of this invention, the insulation supports the thermal elastic sheet-metal skin 16, 116 etc. and maintains the latter at the level of the height of the shear-rail troughs and ensures that the thermal elastic insulation will be of a constant height across the bottom of the hold compartment.

The paperboard insulation may also be of the resin-impregnated type while the honeycombs thereof are preferably filled with a comminuted insulating substance such as perlite and/or with a foam synthetic resin (e.g. cellular polyethylene or polystyrene). Thus all of the honeycombs may be filled with perlite or rigid-foam resin or partly filled with each.

In the anchored system illustrated in FIGS. 13 and 14, the tension rods may be composed of stainless steel and may be anchored to aluminum sleeves forming resiliently yieldable bodies or to aluminum sleeves bearing against resiliently compressible means. The aluminum sleeves, in turn may be shrunk onto their stainless-steel bushings while being zinc-soldered to secure the aluminum sleeves to the stainless-steel pedestal or rod. Furthermore, the trough-like recesses for the shear rails or the shear rails themselves may be longitudinally subdivided into a plurality of sections along the length and breadth of the tank.

As described in the commonly assigned copending application Ser. No. 663,577 filed Aug. 28, 1967 by Rudolf Becker and entitled "Tankship Container for Liquefied Gas," the thermoelastic sheet-metal skin 16, 116 etc. is composed of plates which are secured together at the peripheries of these plates and subjected to low temperatures (i.e. below −160° C. for aluminum sheet) and then raised to ambient temperature. As noted in this application, it has been observed that the shrinkage of the sheet metal in its plane upon cooling results in a plastic deformation thereof which, upon reforming, creates in the sheet a multiplicity of corrugations, wrinkles or folds which, without rupturing the sheet, permit thermal expansion and contraction in the planes thereof. Furthermore, since these sheets are welded together via upturn or downturn flanges and are secured to the sheet-metal liners 17 of the troughs or channels, thermal expansion and contraction is facilitated.

We claim:

1. In a tankship for the transportation of liquefied gas at low temperature wherein a plurality of generally prismatic tanks are disposed in and substantially conform to the configuration of respective hold compartments and are supported therein, the improvement which comprises:
mounting means between a floor member of the respective compartment and a juxtaposed wall member of the respective tank, said mounting means including a longitudinally extending shear rail mounted on one of said members, a longitudinal channel at least partly receiving said rail and formed on the other of said members and slidably receiving said rail to permit longitudinal expansion and contraction of the tank with respect to the floor member of the compartment, means associated with said channel and with said rail for thermally insulating said wall member from said floor member while maintaining same in force-transmitting and load-supporting relationship; and
wherein the walls of said tanks including said wall member are composed of substantially contiguous interconnected outwardly convex cylindrical shell sections, and partitions spanning the tanks and secured to said cylindrical shell sections at their junctions, said mounting means further including extensions of said partitions having intersections below the tank and means forming feet supporting the tank on said floor at said intersections of said partitions, said mounting means further comprising tension bands connecting the rails of the respective tanks to said intersections of said partitions.

2. The improvement defined in claim 1 wherein said tanks are provided at their bottoms with at least two mutually orthogonal rails in 90° intersecting relationship, said floor being provided with corresponding channels in intersecting relationship for receiving said rails.

3. The improvement defined in claim 1, further comprising at least one annular rail carried by the tank and a boss upstanding from said floor member and received in said annular rail with limited play, and load-supporting thermal insulation between said annular rail and said floor.

4. The improvement defined in claim 3 wherein said annular rail is centered upon and surrounds the intersection of a pair of longitudinal rails of respective arrays.

5. The improvement defined in claim 3, further comprising a support foot on the tank at the center of said rail and surrounded thereby in load-transferring relationship with said floor.

6. The improvement defined in claim 1, further comprising tensioning means for locking said rails in place upon the positioning of said tanks in said compartments, and closable ports formed in said floor for affording access to said rails, thereby enabling final adjustment of said rails upon the proper positioning of said tanks.

7. The improvement defined in claim 1, further comprising tie means along the sides of said tanks for tensioning same against said floor.

8. The improvement defined in claim 1 wherein said tie means includes at least one plate welded onto the respective tank and lying in a vertical plane while being provided with an opening, a pedestal anchored to said floor, thermal-insulation means between said floor and said pedestal for limiting heat transfer therebetween, and tension means engaging said plate through said opening while being secured to said pedestal for retaining the tank against said floor and absorbing vertical force moments arising from rolling of the ship.

9. The improvement defined in claim 1, further comprising a thermally elastic substantially continuous sheet-metal skin extending between said wall member and said floor member, and through said channels.

10. The improvement defined in claim 9, further comprising a layer of load-supporting thermal insulation between said floor and said skin.

11. The improvement defined in claim 10, further comprising a layer of thermal insulation disposed between said wall member of said tank and said skin.

12. The improvement defined in claim 10 wherein said skin lies between plaques of load-supporting thermal insulation in said channels.

13. The improvement defined in claim 1 wherein said shear rails have downwardly open U-shaped cross-sections with upwardly converging flanks, said channels being provided with upwardly projecting load-transmitting members resiliently received in said rails.

14. The improvement defined in claim 13, further comprising a bed of load-supporting thermal insulation received in said channels and receiving said load-transmitting members.

15. The improvement defined in claim 1 wherein said rails have downwardly converging sidewalls, said channels being provided with downwardly converging rail-receiving members and load-transmitting thermal insulation enclosing said rail-receiving members.

16. A tankship for the transportation of liquefied gas, comprising:

a hull forming a hold provided with a floor;
at least one tank for said liquefied gas mounted on said floor within said hold and thermally insulated from said hull while having a lower wall spaced above said floor;
a continuous sheet-metal skin disposed intermediate said wall and said floor between said tank and said hull, said skin being composed of plates welded in fluid-tight relationship together along their peripheries and being provided with means affording thermal expansion and contraction of said skin in the planes of said plates; and
mating longitudinally extending male and female formations on said floor and said tank forming a shear-rail assembly supporting said tank in weight-transmitting relationship with said hull floor, said skin extending through said assembly without interruption.

17. The tankship defined in claim 16, further comprising a bed of load-supporting thermal insulation between said skin and said hold, and a further mass of thermal insulation between said tank and said skin.

18. The tankship defined in claim 16 wherein said skin is composed of aluminum and is provided with folds permitting expansion and contraction thereof in said planes.

19. The tankship defined in claim 9 wherein said skin is composed of plates welded in fluid-tight relationship together along their peripheries and being provided with means affording thermal expansion and contraction of said skin in the planes of said plates.

20. The tankship defined in claim 19, further comprising a bed of load-supporting thermal insulation between said skin and said hold, and a further mass of thermal insulation between said tank and said skin.

21. The tankship defined in claim 19 wherein said skin is composed of aluminum and is provided with folds permitting expansion and contraction thereof in said planes.

References Cited

UNITED STATES PATENTS

| | | |
|---|---|---|
| 3,071,094 | 1/1963 | Leroux. |
| 3,082,726 | 3/1963 | Dosker. |
| 3,145,680 | 8/1964 | Farkas et al. |

TRYGVE M. BLIX, Primary Examiner

U.S. Cl. X.R.

220—9